Figure 1:
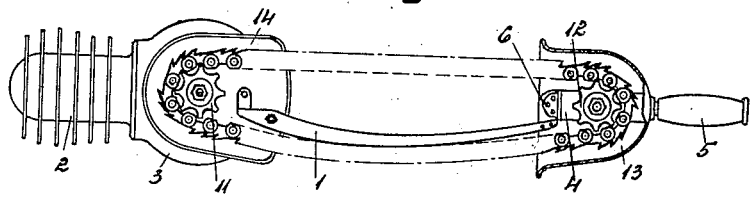

Dec. 13, 1932.　　　　F. W. MEYER　　　　1,891,105
CHAIN SAW STRUCTURE FOR PORTABLE MOTOR TREE SAWS
Filed Oct. 9, 1931

Inventor
Friedrich Wilhelm Meyer
By B. Singer, Atty.

Patented Dec. 13, 1932

1,891,105

UNITED STATES PATENT OFFICE

FRIEDRICH WILHELM MEYER, OF VIENNA, AUSTRIA

CHAIN SAW STRUCTURE FOR PORTABLE MOTOR TREE SAWS

Application filed October 9, 1931, Serial No. 567,959, and in Austria October 14, 1930.

The invention relates to guiding devices for endless saw chains used especially in hand motor saws. These devices have been designed for the purpose to guide and to support the saw chain and to take up i. e. to receive the forces originating from the sawing process. The known devices of this kind are generally composed of a thin leaf-shaped rail or a thin but rigid frame, which passes through the cut at the same time as the saw chain, its one end being fixed to the motor body, whilst the other is formed into a handle for carrying and, if necessary, for steering the saw. This device, which, taken perpendicularly to the path of the chain, is quite thin, if taken in the chain path plane is of such a size and shape as to occupy the whole or nearly the whole space between the advancing and the returning side of the chain. The disadvantage of the guide member being rigid and of considerable width (taken in the direction of the cut) resides in the fact that a jamming of the saw is unavoidable in all cases in which a perfectly plane and uniform cut cannot be obtained owing to knots and knobs in the wood or on account of other circumstances. In these cases a regular operation of the saw is impossible, the saw slipping on the guides and breaking, often enough. A further disadvantage of these devices is their heavy weight, which means an undesired extra-load for the operator.

The subject matter of this invention is a guiding device for endless saw chains particularly adapted for hand motor saws, which provides for the elimination of the drawbacks described, rendering possible a supple and safe following of the non-working chain side and of the part of the device serving as guide for same, even in case of uneven cuts. The device is composed either of a bar-shaped thin and narrow guide rail serving as guide only for the operating (advancing) side of the chain, called "guide bar" in the following, or of two or more of such guide bars, providing guidance for both sides of the chain. The height (or width) of these bars, taken in the plane of the chain path, will, preferably, be three or five times the width of the cut of the saw chain i. e. three or fivefold of its own thickness. By using thin and narrow bars as guide rails, a certain elasticity of the device is warranted. According to the sense of this invention a springy material is used for these bars (preferably spring steel), so that same will be elastic and will allow of a certain deflection and bending in all directions, especially in planes perpendicular to the chain path.

The use of a thin bar as guide rail permits the chain guide to take the shape of an arc, thin bars being capable of assuming this shape without difficulty. This feature is of importance considering that it renders possible the cutting of trunks, close to the ground.

It is a further characteristic feature of these bars and of the guidance devices made from same, that they can be brought into a state of tension either by bending a straight bar, or by straightening a bent one or by giving a sharper curve to an already bent bar. In this manner the rigidity of the guiding device can be modified.

The guiding device, composed of one or several bars is joined on one side to the motor body in the same manner as the guiding devices known, whilst at the other end a carrying and supporting handle is attached, the bars being arranged outside of the connection line of the chain return points. However, the bar may also have the shape of a frame or a loop in which case no handle is required.

If a single bar is employed, acting as guidance member for the operating chain side only, same will easily pass even a non-plane cut, together with the side of the chain resting on it and with the return side of the chain, following in the cut, as the bar is capable of bending and of adapting itself to the sides of the cut. The same is the case with the chain side following, which is perfectly independent of the guide member (bar).

If, however, the guide member is built of several bars—on one side independently joined to the motor body and on the other side carrying a handle—or if the member consists of a frame composed of bars, the bars or frame parts carrying the sides of the chain following each other in the direction of the cut, will be capable, owing to their elasticity, of moving and bending independently of each other in planes perpendicular to the path of the chain so that in case of an uneven cut the bars and frame parts supporting the various chain parts will adapt themselves to the surface of the cut guaranteeing in this manner an accurate and reliable guidance of the chain.

By using elastic bars of this kind for the guidance of the chain it is possible to fit a guard to the returning i. e. free side of the chain, which guard is so designed as to pass through the cut together with the guiding device itself. This guard is made of a single bar, equal in thickness to the guide bar, but considerably less wide, which is fastened to the guide bar above the chain.

If the device is composed of two or more bars or of a frame, the rigidity imparted to the device by bracing the bars, can be maintained by means of distance pieces located between the bars or the frame parts and linked to same. This method of joining the distance pieces to the bars and frame parts does not impair their respective mobility.

Figure 2:
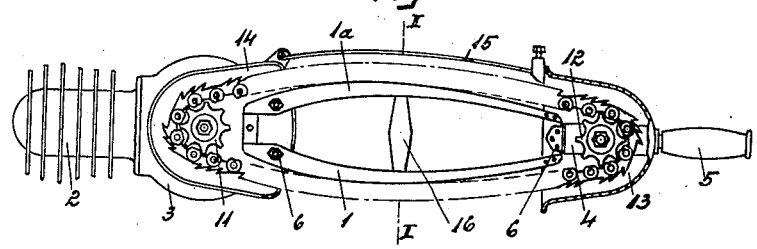
Figure 3:
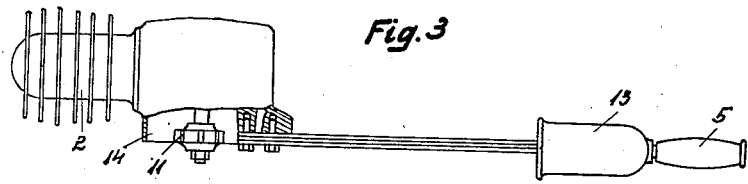
Figure 4:
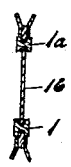
Figure 6:
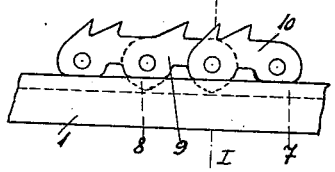
Figure 7:
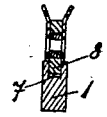
Figure 8:
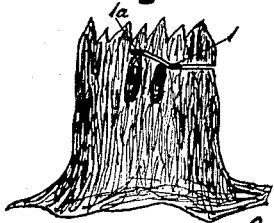

The drawing shows by way of example three different embodiments of the subject matter of invention, Fig. 1 being a side view of the saw chain device having only one guide bar, Fig. 2 a side view of a device composed of two guide bars, between which a distance piece has been arranged. Fig. 3 is a view from above on these two devices, Fig. 4 a section through the guide member along the line II—II of Fig. 2, Fig. 5 a side view of a loop-shaped or frame bar, whilst Fig. 6 is a side view of a part of a rail with a chain resting on it. Fig. 7 is a section through the rail and the chain according to the line I—I of Fig. 6. Fig. 8 a perpendicular section through a tree with a cut passing through a knot, showing the location of the guide rails in same.

According to the embodiment shown in Fig. 1 an elastic guide rail 1 is provided, which by screws 6 and other fastening means, located outside of the connection line of the two return points, is attached on the one side to the motor body 2 of an internal combustion engine 3 and, on the other side, to the extension piece 4 of the supporting and carrying handle 5. The rail is provided in a manner known with a groove 7 into which the projections 8 of the members 9 of the endless chain 10 advancing on the guide bar are made to engage. The chain passes over the sprockets 11, 12, the first of which taking care of the drive and the latter of the guidance of the chain. The handle 5 is fitted with a bell-shaped protector 13 covering the chain at one point of return, whilst the housing 3 is provided with a protecting cap 14 which embraces the other return point. The bell-shaped protector 13 is connected to the protecting cap 14 by means of an elastic protecting bar 15, covering the return side of the saw chain.

The embodiment according to Fig. 2 shows a second rail 1a beside the rail 1 which is also elastic and is placed outside of the connecting line of the saw return points (reversing points). This second rail is also connected to the frame 2 of the crank case and to the extension piece of the handle. This two rail arrangement is generally used in saws of great cutting length and in all other cases where vibrations during the sawing process are to be reckoned with.

With both embodiments (according to the Figs. 1 and 2) the bars are arc-shaped (curved), the bars according to Fig. 2 being braced by means of a distance piece 16, linked to the rails.

Figure 5:
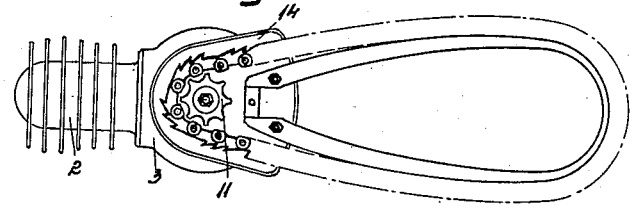

The embodiment according to Fig. 5 shows a device composed of a loop-shaped elastic bar the ends of which are attached to the motor body 2. In this embodiment a handle is not required. The chain is driven by means of the sprocket 11 and, as to the rest, travels in the guide grooves of the bar.

It has been ascertained that the guide rail from the motor to the handle or to the side opposite the motor is subjected to strains and stresses such as are found in cantilever beams. This is the reason why the embodiments shown are of stronger design at the side of the motor and gradually become weaker towards the other end.

The device operates as follows: A tree is to be felled. The chain saw is applied in the usual manner with the purpose of obtaining a level and even cut. If, however, the chain teeth meet a spot in the wood which differs in hardness from the surrounding material, for instance a knot or knob, the saw will give way in the manner shown in Fig. 8, the cut will cease to be plane, the cutting and especially the returning chain side endeavouring to follow the new cut which will be uneven and not rectilinear anymore. When using a device composed of one guide bar only, the latter will be readily capable of following the curves of the cut, especially as the height (or width) of the bar is little, whilst the returning side of the chain, not being provided with a guide, will without the slightest difficulty adapt itself to shape of the cut.

In case of the saw chain guide consisting of two or more bars (Fig. 2) or of a frame composed of bars, the individual bars or frame parts easily adapt themselves to the surfaces of the walls of the cut, independently of each other, owing to their great elasticity and to their reduced height. As has been shown in Fig. 8 on an exaggerated scale, the rail carrying the operating chain side will be high and horizontal whilst the rail supporting the return side lies deeper and at an oblique angle with respect to the former. This adaptation will, however, also be possible, if as shown in Fig. 2 the bars are braced and kept under tension by means of a distance piece, considering that this piece is linked to the rails and does not prevent their moving and adjusting themselves independently of each other.

In any case the saw chain will find a permanent and safe guidance on the guide bars and neither derail nor break, whatever the shape of the cut.

Having thus described my invention, I claim:

1. In portable motor tree saws a chain saw structure comprising an endless saw chain, a driving sprocket wheel, and a yieldable and twistable guide bar fastened to the motor, a guiding sprocket wheel fixed to said bar, the centers of the sprocket wheels being located in the line connecting the chain return points and the guide bar being arranged outside of such connection line.

2. In portable motor tree saws a chain saw structure comprising an endless saw chain, a driving sprocket wheel, and a bent, yieldable and twistable guide bar fastened to the motor, a guiding sprocket wheel fixed to said bar, a centers of the sprocket wheels being located in the line connecting the chain return points and the guide bar being arranged outside of this connection line.

3. In portable motor tree saws a chain saw structure comprising an endless saw chain, a driving sprocket wheel, and a yieldable and twistable guide bar the height of which is from three- to five fold of its thickness, fastened to the motor, a guiding sprocket wheel fixed to said bar, the centers of the sprocket wheels being located in the line connecting the chain return points and the guide bar being arranged outside of this connection line.

4. In portable motor tree saws a chain saw structure comprising an endless saw chain, a driving sprocket wheel, and a guiding device consisting of at least two elastic and twistable bars mounted on the motor, a guide sprocket wheel fixed to said device, the centers of the sprocket wheels being located in the line connecting the chain return points and the guiding device being arranged outside of this connection line.

5. In portable motor tree saws a chain saw structure comprising an endless saw chain, a driving sprocket wheel and a guiding device consisting of at least two elastic and twistable arc-shaped bars mounted on the motor, a guide sprocket wheel fixed to said device, the centers of the sprocket wheels being located in the line connecting the chain return points and the guiding device being arranged outside of this connection line.

6. In portable motor tree saws a chain saw structure comprising an endless saw chain, a driving sprocket wheel and a guiding device, consisting of at least two elastic and twistable bars mounted on the motor, a guide sprocket wheel fixed to said device, the centers of the sprocket wheels being located in the line connecting the chain return points and the guiding device being arranged outside of this connection line, a distance piece being located between the bars and linked to same for the purpose of bracing same without impairing their respective mobility.

7. In portable motor tree saws a chain saw structure comprising an endless saw chain, a driving sprocket wheel and a loop-shaped yieldable and twistable guide bar fastened to the motor.

8. In portable motor tree saws a chain saw structure comprising an endless saw chain, at least one sprocket wheel and a yieldable and twistable guide bar, for supporting the chain, the guide bar tapering in the direction away from the motor.

9. In portable motor tree saws a chain saw structure comprising an endless saw chain, a driving sprocket wheel and a guiding device consisting of a yieldable and twistable bar mounted on the motor, a guide sprocket wheel fixed to said device, and a guard bar arranged above the chain.

In witness whereof I affix my signature.

FRIEDRICH WILHELM MEYER.